(12) United States Patent
Fernandez del Rio et al.

(10) Patent No.: US 8,922,838 B2
(45) Date of Patent: Dec. 30, 2014

(54) TECHNIQUES RELATED TO PRINTING

(75) Inventors: Jaime Fernandez del Rio, San Diego, CA (US); Jacint Humet Pous, Santa Perpetua de Mogoda Barcelona (ES); Eduardo Amela Conesa, Granyena de Segarra Lleida (ES); Marc Serra Vall, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 13/607,114

(22) Filed: Sep. 7, 2012

(65) Prior Publication Data

US 2014/0071465 A1    Mar. 13, 2014

(51) Int. Cl.
*H04N 1/60* (2006.01)
*B41J 29/38* (2006.01)

(52) U.S. Cl.
USPC .......................... 358/3.27; 358/406; 358/504

(58) Field of Classification Search
None
See application file for complete search history.

(56) References Cited

U.S. PATENT DOCUMENTS

| | | | |
|---|---|---|---|
| 6,877,850 B2 | 4/2005 | Ishimoto et al. | |
| 7,357,472 B2 * | 4/2008 | Yamanobe | 347/15 |
| 7,645,019 B2 | 1/2010 | Hirakawa | |
| 7,682,015 B2 | 3/2010 | Hoshino | |
| 8,180,230 B2 * | 5/2012 | Klassen | 399/27 |
| 2006/0203019 A1 * | 9/2006 | Yamanobe | 347/12 |
| 2008/0285990 A1 * | 11/2008 | Nishizawa | 399/49 |
| 2011/0007359 A1 * | 1/2011 | Yamakawa et al. | 358/1.15 |
| 2011/0242556 A1 | 10/2011 | Jinno et al. | |
| 2013/0061767 A1 * | 3/2013 | Casals et al. | 101/202 |

OTHER PUBLICATIONS

U.S. Appl. No. 13/229,186, filed Sep. 9, 2011, Jacint Humet Pous et al.

* cited by examiner

*Primary Examiner* — Kimberly A Williams

(57) ABSTRACT

Application of treatments for treating a colorant for printing an image is described herein. In an example, an amount of a treatment to be applied on a substrate portion is determined considering color calibration of a printing system for specific conditions of printing the image. The treatment is for treating the amount of colorant on the substrate portion.

14 Claims, 6 Drawing Sheets

TECHNIQUES RELATED TO PRINTING

BACKGROUND

In printing, a treatment may be used for treating a colorant on a substrate. Generally, such treatment is aimed to improve print quality by enhancing fixation of colorant on the substrate. Such a treatment may include, for example, a pre-treatment component or a post-treatment component.

For example, a pre-treatment component may be applied on a portion of a substrate to enhance fixation (e.g., bonding and/or hardening) of a colorant to be subsequently applied on that portion of the substrate. If the colorant includes an ink, fixation may be desired to address coalescence, bleed, feathering, or similar effects characterized by ink or pigment migration across a printed surface. In other examples, post-treatment fluids may be applied in colorant already applied on the substrate. Such a post-treatment may be to provide a coating over the printed image. A treatment may be also applied quasi-simultaneously to the colorant.

Common methods for applying treatments on a substrate include roll coating, spray coating, manual application or treatment ejection, for example, through a jetting device.

BRIEF DESCRIPTION OF THE DRAWINGS

In order that the present disclosure may be well understood, various examples will now be described with reference to the following drawings.

DETAILED DESCRIPTION

Figure 1:
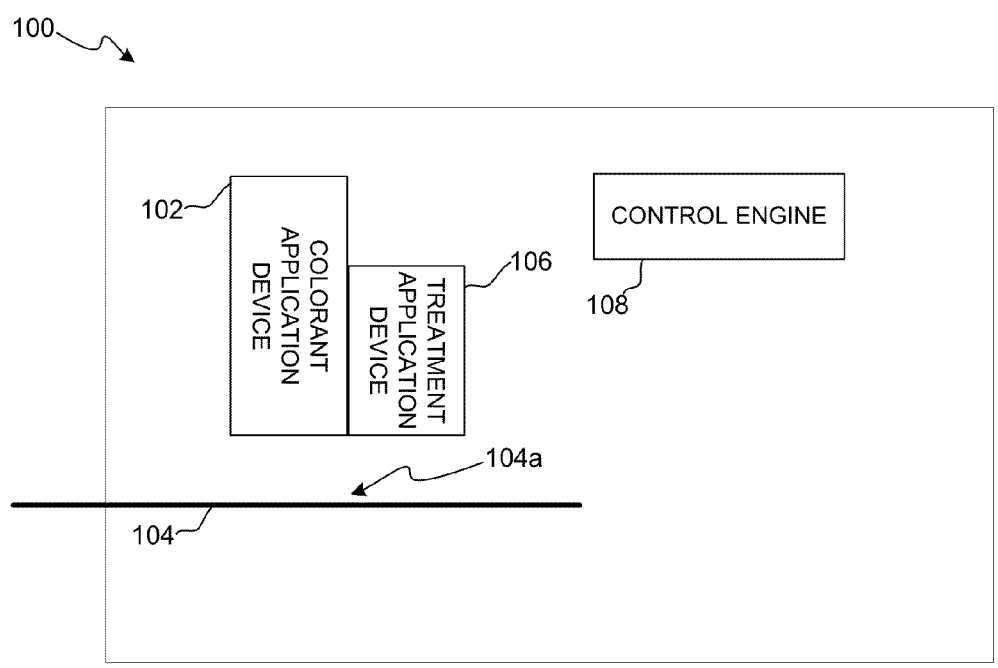
FIG. 1 is a block diagram schematically illustrating printing systems according to examples.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Like numerals are used for like and corresponding parts of the various figures.

As set forth above, in printing, a treatment may be applied on a substrate for treating a colorant on a substrate. The amount of treatment to be applied on a specific region of the substrate may be chosen in consideration of the color density to be achieved in that specific region of the substrate, since color density is related to the amount of colorant to be applied on a specific region. For example, an amount of colorant to be applied can be determined from the color separation step in a printing pipeline step. An input may be a contone CMYK value (i.e., a color density for cyan, magenta, yellow, or black) and the output may be a CMYK contone ink value (i.e., a quantity of ink associated with the respective color density). The amount of treatment to be applied might be derived then from the CMYK contone ink value.

However, the final amount of colorant that is applied in a substrate may vary as a consequence of color calibration of the printing system for specific conditions of printing an image. Color calibration may vary for different conditions of printing different images, for example, but not limited to, because a change of printing substrate or colorant types. A specific example of considering color calibration of the printing system is applying color linearization data. Color linearization data is used to solve the printer's inability to reproduce a straight line of tones from full color to white. The color linearization data may be applied after a color separation step for determining the amount of colorant to be applied on a substrate region. It will be understood that color calibration may include other processing that affect colorant amount in view of specific printing conditions. Generally, color calibration is aimed to preserve color density against variations of other print parameters. For example, color calibration may vary colorant amounts for preserving color density on different substrates. Color calibration may also be applied to avoid color variations caused by the use of a new printing pen. Other processing that influences color calibration may include, but are not limited to, using a new ink batch or changing of ambient conditions (e.g., humidity).

If color calibration is neglected at the time of determining the amount of treatment to be applied in a specific substrate region, the ratio of treatment to colorant in that substrate region may be unsuitable for achieving a desired colorant treatment and may, therefore, negatively impact print quality.

In at least some of the examples herein, an amount of a treatment to be applied on a specific substrate portion is determined considering color calibration of the printing system for specific conditions of printing an image. Thereby, it is facilitated that a ratio of treatment to colorant in that substrate region comes closer to a specific treatment-colorant ratio aimed to achieve a desired colorant treatment.

As used herein, a colorant refers to a composition suitable for reproducing an image when applied on a substrate. Examples of such a colorant are inks or dry toner. An ink, as used herein, refers to a liquid or paste that contains pigments or dyes and is usable to reproduce an image on a substrate via printing. Toner, as used herein, refers to a powder usable to reproduce an image on a substrate via xerography.

As used herein, a treatment refers to a composition suitable to achieve a specific effect on a colorant when applied on a substrate. Examples of such effects include, but are not limited to, fixation of a colorant to the substrate or coating of the colorant on the substrate. Some specific examples of colorants and treatments are set forth below.

As used herein, color calibration of a printing system for specific conditions of printing a particular image refers to means specific for the printing system and the specific conditions (for example, but not limited to, colorant type, ambient conditions, or substrate type) that aims to adjust the color output of the printer to a known state. Color calibration may include color linearization, i.e., correlation of input color values to be reproduced by a printing system and reproduced color values to correct for a printer's inability to reproduce a straight line of tones from full color to white.

FIG. 1 schematically illustrates a printing system 100 according to examples. Printing system 100 includes a colorant application device 102 for applying a colorant on a region 104a of a substrate 104, and a treatment application device 106 for applying a treatment on substrate region 104a. The treatment is for treating the colorant on the substrate. Printing system 100 further includes a control engine 108.

Printing system 100 may be constituted by any type of printer such as an inkjet printer, a laser printer, a digital press, or a web press. Colorant application device 102 may be constituted by any type of application device suitable to apply a colorant on a substrate. Generally, colorant application device 102 is constituted according to the characteristics of printing system 100. For example, in case printing system 100 is an inkjet printer, colorant application device 102 may include a printhead. Examples of scanning printheads are illustrated below with respect to FIG. 2. In other examples, the printhead is a page wide array printhead. In another non-limiting example, in case printing system 100 is a laser printer, colorant application device 102 may include a xerographic device that applies colorant toner on substrate 104 through the cooperation of a charger to charge a latent image receiver (for example, a photoconductor), a laser scanner to generate a latent image on the latent image receiver, a toner applier to supply a toner to the charged latent image receiver, and a transfer system for transferring the latent image to the substrate.

Treatment application device 106 may be constituted by a set of components suitable to apply a treatment on a substrate. For example, treatment application device 106 may be comprised of a jetting device for selectively jetting over a substrate portion a fluid comprised of the treatment on a region of the substrate. Treatment fluid application device 106 is arranged to vary amounts of treatment over different regions of substrate 104 during the process of reproducing a printed image thereon. In examples where the treatment is a treatment fluid, an amount of treatment fluid may be interpreted as a drop amount of a treatment fluid that is applied to a particular surface area of the substrate.

Control engine 108 represents generally any combination of hardware and programming configured to determine an amount of a treatment to be applied on a region 104a of substrate 104 considering color calibration of the printing system for specific conditions of printing the image. (Some specific examples on how the amount of treatment can be determined are illustrated below with respect to FIG. 3.) A control engine according to examples herein may be implemented in a number of fashions, one example thereof being illustrated with respect to FIG. 7.

Figure 7:
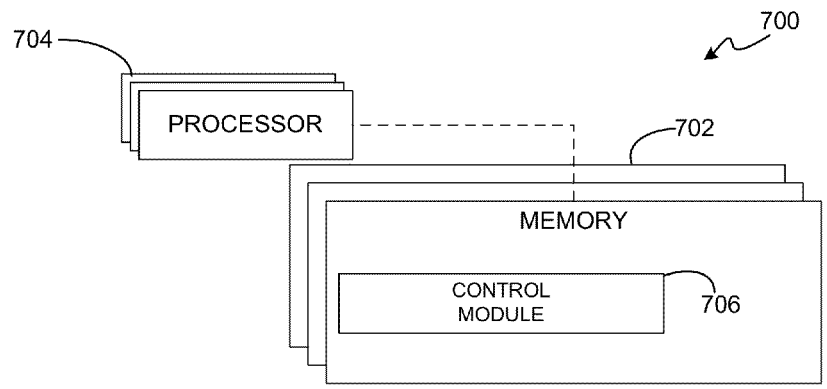
FIG. 7 schematically depicts a system for causing a printing system to print an image on a substrate according to examples.

FIG. 7 depicts a specific example of control engine 108 and, more specifically, of system 700 for causing a printing system to print an image on a substrate. As illustrated by system 700, the programming referred to above may be processor executable instructions stored on a tangible memory media 702 and the hardware may include a processor 704 for executing those instructions. Memory 702 implements a non-transitory medium readable by processor 704. Memory 702 can be said to store program instructions that when executed by processor 704 implement control engine 108. Memory 702 may be integrated in the same device as processor 704 or it may be separate but accessible to that device and processor 704. Each of memory 702 and processor 704 may be respectively integrated in a single system component or may be distributed among multiple system components.

In an example, the program instructions can be part of an installation package that can be executed by processor 704 to implement control engine 108. In this case, memory 702 may be a portable medium such as a CD, DVD, or flash drive or a memory maintained by a server from which the installation package can be downloaded and installed. In another example, the program instructions may be part of an application or applications already installed. Here, memory 702 can include integrated memory such as a hard drive.

In FIG. 7, the executable program instructions stored in memory 702 are depicted as control module 706. Control module 706 represents program instructions that when executed cause the implementation of control engine 108.

Figure 2:
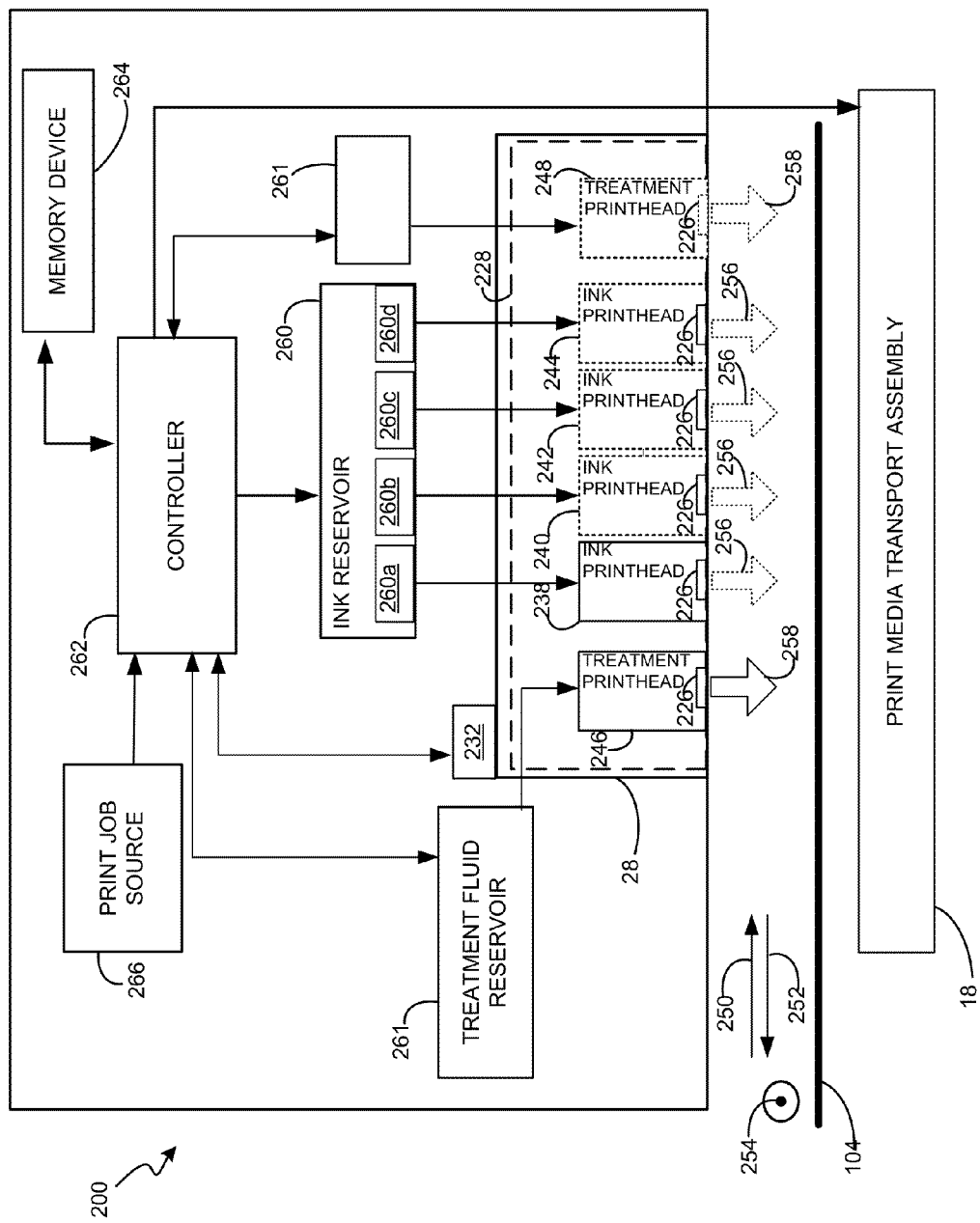
FIG. 2 is a block diagram schematically illustrating printing systems according to examples.

In the following, reference is made to FIG. 2 for illustrating a specific example of printing system 100. FIG. 2 shows a block diagram of a printer 200 for implementing various examples of a printing system as described herein. It will be understood that the following description of printer 200 is merely illustrative and does not limit the components and functionality of printing systems described herein. More specifically, printer 200 is an inkjet printer. As mentioned above, a printer system according to examples herein may be based on other operational principles distinct from inkjet printing.

As shown in the diagram, printer 200 includes a plurality of ink printheads 238, 240, 242, 244. Each of the ink printheads is configured to eject ink 256 of a different color through nozzle arrays 226. In particular, ink printheads 238, 240, 242, 244 are fluidly connected to an ink reservoir 260. Ink reservoir 260 includes separated ink reservoirs 260a, 260b, 260c, 260d for providing ink to the respective ink printhead. In the illustrated example, separated ink reservoirs 260a, 260b, 260c, 260d respectively store cyan ink, magenta ink, yellow ink, and black ink Base colors are reproduced on substrate 104 by depositing a drop of one of the above mentioned inks corresponding to the desired base color onto a dot location. A plurality of ink printheads enables reproduction of secondary colors by combining ink from different ink printheads. In particular, secondary or shaded colors are reproduced by depositing drops of different base colors on adjacent dot locations; the human eye interprets the color mixing as the secondary color or shading.

Treatment printheads 246, 248 are configured to eject a treatment 258 (in this example, a treatment fluid 258) through nozzle arrays 226 for treating ink in a portion of substrate 104 (i.e., print area 104a of substrate 104 depicted in FIG. 1). Application of the treatment fluid on a particular spot of a print area may be performed before, substantially simultaneously, or after application of the ink for reproducing a particular color on that spot. The block diagram shows that treatment printheads 246, 248 are fluidly connected to a treatment fluid reservoir 261.

Ink reservoir 260 and treatment fluid reservoir 261 may include disposable cartridges (not shown). The reservoirs may be mounted on carriage 228 in a position adjacent to the respective printhead. In other configurations (also referred to as off-axis systems), a small fluid supply (ink or treatment) is provided to cartridges (not shown) in carriage 228, each cartridge being associated to a respective printhead; main supplies for ink and fixer are then stored in the respective reservoirs. In an off-axis system, flexible conduits are used to convey the fluid from the off-axis main supplies to the corresponding printhead cartridge. Printheads and reservoirs may be combined into single units, which are commonly referred to as "pens".

It will be appreciated that examples can be realized with any number of printheads depending on the design of the particular printing system. For example, printing system 200 may include at least one treatment printhead, such as two or more treatment printheads. Furthermore, printing system 200 may include at least one ink printhead, such as two to six ink printheads, or even more ink printheads. Further, a printhead of printing system 200 may be a disposable printhead or a fixed printhead, which is designed to last for the whole operating life of printing system 200. In the illustrated examples, ink printheads are disposed at one side of a treatment printhead. It will be understood that ink printheads may be disposed at both sides of a treatment printhead.

The carriage may include one treatment printhead. In the example illustrated in FIG. 2, treatment printhead 246 or treatment printhead 248 may be the single treatment printhead in carriage 228; one or more ink printheads, such as ink printheads 238, 240, 242, 244, may be arranged at one side of the treatment printhead. In other examples herein, the carriage includes at least two treatment printheads disposed along a transition axis of the carriage. At least one ink printhead may be disposed between the treatment printheads. In the illustrated examples, unless a treatment printhead is completely offset from an ink printhead along an axis coincident with media advance direction 254, a treatment printhead trails or leads relative to the ink printheads during a carriage transition for printing. In the configuration illustrated in FIG. 2, during carriage transition treatment printhead 246 trails behind the ink printheads in forward direction 250 and leads before the ink printheads in backward direction 252. On the other hand, treatment printhead 248 leads before the ink printheads in forward direction 250 and trails behind the ink printheads in backward direction 252. Therefore, whether a treatment printhead is at trailing or at leading relative to an ink printhead depends on the particular printhead arrangement and the particular carriage transition direction.

The printheads may be arranged according to a linear configuration, in which the printheads are aligned along the direction of carriage transition (e.g., along directions 250, 252). Alternatively, the printheads may be arranged in a staggered configuration, in which the printheads are partially offset from adjacent printheads along an axis coincident with media advance direction 254.

A controller 262 based on an electronic processor unit is configured for being operatively connected to the above described elements of printing system 200 as well as a memory device 264 and a printjob source 266. Controller 262 is configured to execute methods according to the present disclosure. Controller 262 may include a processor for executing methods described herein, such as processor 704 depicted in FIG. 7.

Controller 262 may be implemented, for example, by one or more discrete modules (or data processing components) that are not limited to any particular hardware, firmware, or software (i.e., machine readable instructions) configuration. Controller 262 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

Memory device 264 is accessible by controller 262. Memory device 264 stores process instructions (e.g., machine-readable code, such as computer software) for implementing methods executed by controller 262 as well as data that controller 262 generates or processes such as alignment correction data. Memory device 264 may be physically constituted analogously as memory 702 described above with respect to FIG. 7. In some examples herein, memory 264 may, for example, store one or more LUTs (Look Up Tables) that may associate certain colorant characteristics or other characteristics with treatment fluid amounts.

Controller 262 receives printjob commands and data from printjob source 266, which may be a computer or any other source of printjobs, in order to print an image. In the example, controller 262 is configured to determine a print mask from the received data. The received data itself may already correspond to a print mask. A print mask refers to logic that includes control data determining which nozzles of the different printheads are fired at a given time to eject fluid in order to reproduce the printjob. Controller 262 is operatively connected to treatment printheads 246, 248, ink printheads 238-244, and the respective reservoirs to control, according to the print mask: a) ejection of ink 256 and treatment fluid 258, and b) motion of carriage 228 and substrate 104. The print mask may be stored in memory device 264.

Controller 262 in cooperation with memory 264 may be responsible of implementing control engine 108 analogously as illustrated above with respect to FIG. 7.

Figure 3:
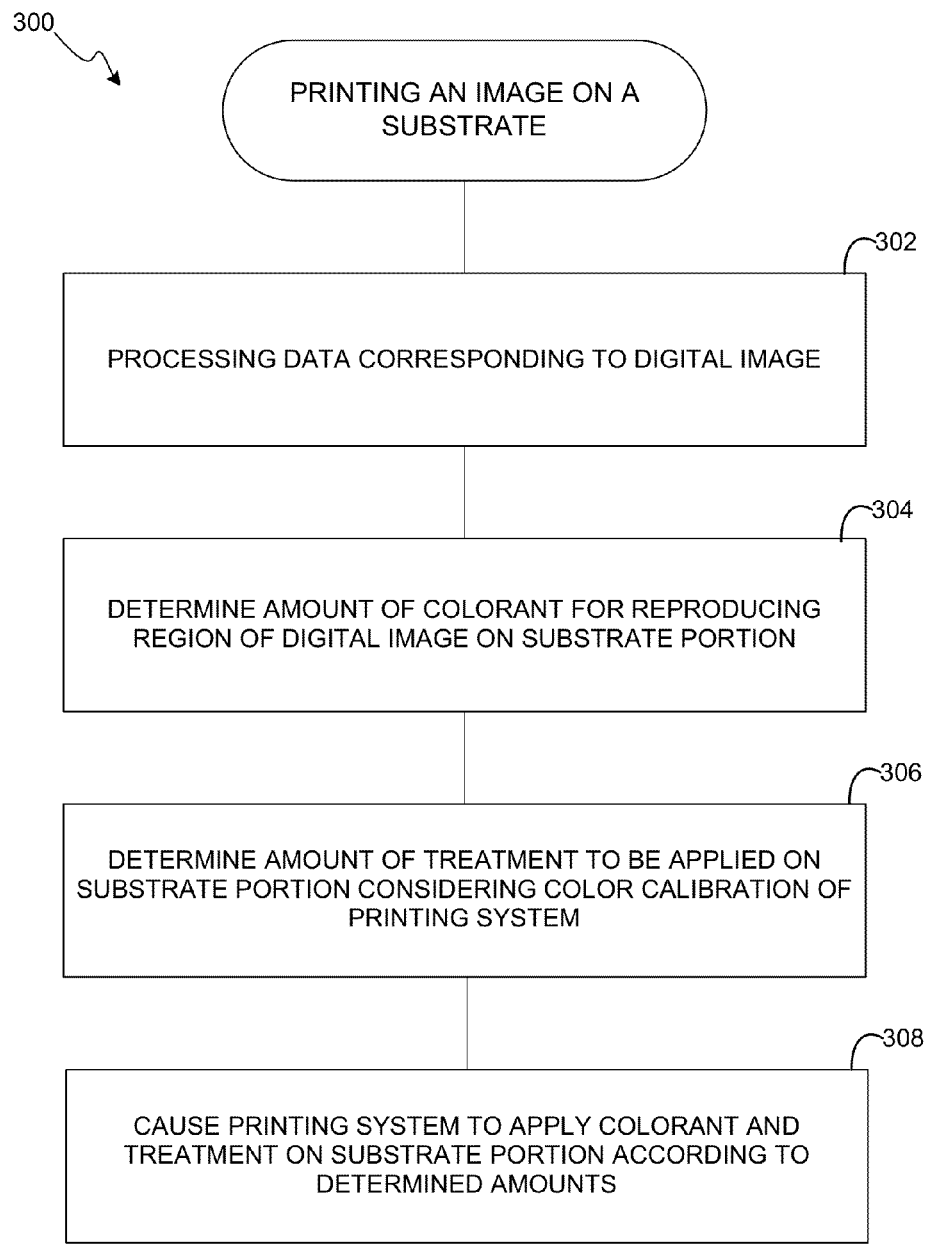
FIG. 3 is a flow chart that implements examples of methods for printing an image on a substrate using printing systems.

FIG. 3 shows a flow chart 300 that implements examples of methods for printing an image on a substrate using printing systems, e.g., any of the printing systems illustrated with respect to FIGS. 1 and 2. In discussing FIG. 3 reference is made to the diagrams of FIGS. 4 to 6D and 8 to provide contextual examples. It will be understood that implementation, however, is not limited to those examples.

Referring to FIG. 3, at block 302 data corresponding to a digital image is processed. Looking at the example of FIG. 1, control engine 108 may be responsible of executing block 302. Looking at the example of FIG. 2, controller 262 may be responsible of executing block 302 in cooperation with print job source 266 and memory 264.

Figure 8:
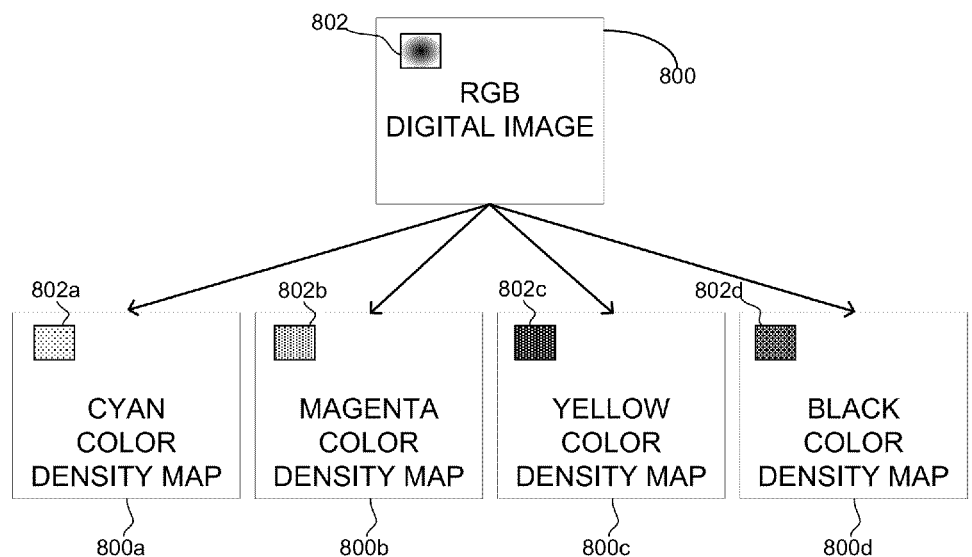
FIG. 8 schematically illustrates color separation according to examples.

Generally, processing of digital image may include any computational step that facilitates generating data that is processed by a printing system for reproducing an image on a substrate. For example, block 302 may include performing a color separation of the digital image. Referring to FIGS. 2 and 8, printjob source 266 may provide controller 262 with a digital image 800. Generally, the digital image 800 is provided by an external computer as data representing the basic colors of the source. As illustrated in FIG. 8, the basic colors of the source may be red, green, and blue. It will be understood that digital image 800 may be provided using other types of combinations of basic colors. Color separation of digital image 800 results in a plurality of color density maps 800a-800d, each of the color density maps representing the digital image in one of the basic colors of the printing system. FIG. 8 illustrates color separation for a printing system having cyan, magenta, yellow, and black (CMYK) as basic colors.

Each color density map is indicative of colorant amounts to be applied on the substrate for reproducing digital image 800 thereon. More specifically, a particular region of digital image may contain a color pattern 802. Each of maps 800a-800d includes a corresponding map portions 802a-802d containing color density values color separating color pattern 802 into the basic colors of the printing system. Each of the density values in the respective map portions 802a-802d may be associated with a respective colorant amount (in this example, a cyan colorant amount, a magenta colorant amount, a yellow colorant amount, or a black colorant amount) to be applied on the substrate portion for reproducing color pattern 802 thereon. In other words, when the respective colorant amounts associated with map portions 802a-802d are applied to a substrate portion, color pattern 802 is, at least approximately, reproduced.

It will be understood that a reproduction directly based on color density maps 800a-800d may be inaccurate since it does not consider color calibration of the printer system being used to apply the colorants at the specific conditions of printing a particular image. This might in particular apply if printing conditions differ from default conditions considered to determine colorant amounts from density maps. As will be understood, each printer system has specific reproduction characteristics that affect how colors are reproduced. Moreover, the particular circumstances of a print job, e.g., substrate being used, also affect color reproduction. Therefore, the density maps may be further processed to determine an amount of a colorant for reproducing a region of the digital image on a portion of the substrate, as further illustrated below with respect to FIGS. 5A and 5B.

Referring back to FIG. 3, at block 304, an amount of a colorant for reproducing a region of the digital image on a portion of the substrate is determined. Looking at the example of FIG. 1, control engine 108 may be responsible of executing block 304. Looking at the example of FIG. 2, controller 262 may be responsible of executing block 304 in cooperation with print job source 266 and memory 264. It will be understood that for every substrate portion, a colorant amount for each basic color of the printing system is determined. The determined amount may be zero.

Colorant amounts may be derived from the color density maps from a color separation. For example, memory 264 may store look-up tables (also known as LUT) associating color density with colorant amounts to be applied. Specific LUTs may be selected in view of the specific print conditions (e.g., substrate type) so that color calibration is considered at the time of determining colorant amounts. More specifically, individual LUTs may be built considering the specific calibration parameters of a printer system. For example, different LUTs may be stored for different print conditions. In other examples, basic LUTs may be updated after online color calibration of the printer. Alternatively, or in addition thereto, a color amount determined as being proportional to color density values may be corrected using a linearization factor. Linearization is illustrated below with respect to FIGS. 6A-6D. It will be understood that there is a variety of methods for determining color amounts not limited to the examples above.

Figure 4:
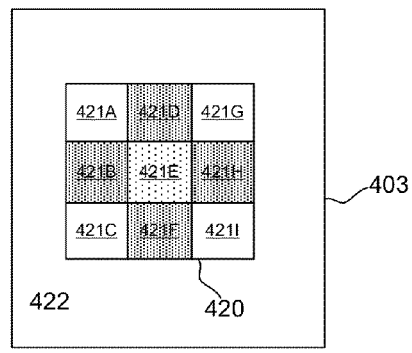
FIG. 4 shows a substrate with an image printed according to examples herein.

In the following, colorant amount determination for different substrate regions is illustrated with respect to FIG. 4. FIG. 4 shows a substrate 403 with a printed image 420. For example, printed image 420 may represent a virtual (digital) reflection of the printed image such as a bitmap or halftone instance. The digital reflection of the printed image may be represented by the digital image data 800 (shown in FIG. 8), from which the various colorant amounts to be applied may be determined before printing, as illustrated above. A set of image portions 421A-421I may be defined by surface areas.

As shown, image portions 421A-421I may have equal surface areas. In the shown example, printed image 420 has nine image portions 421A-421I of equal surface dimensions. Image portions 421A-421I may be defined in dots, pixels, square millimeters, square centimeters, square inches, etc. It will be understood that a printed image may include any number of image portions with equal or differing sizes. As illustrated, around a printed instance of print image 420, a colorant free zone 422 may be provided. As illustrated, each of image portions 421A-421I is characterized by different color patterns. The different color patterns may be reproduced by selectively applying combinations of colorant amounts as described above.

Referring back to FIG. 3, at block 306, an amount of a treatment to be applied on a specific substrate portion is determined considering color calibration of the printing system. Looking at the example of FIG. 1, control engine 108 may be responsible of executing block 306. Looking at the example of FIG. 2, controller 262 may be responsible of executing block 306 in cooperation with print job source 266 and memory 264. In at least some examples herein, a treatment amount is determined for each application of colorant. That is, for each pixel that a printing system is to reproduce on a substrate, colorant amounts for each basic color are reproduced; for each of these colorant amounts, a treatment amount is also determined.

There are a number of methods of considering color calibration for specific conditions of printing a particular image in order to determine a treatment amount. In some of these methods, an unadjusted treatment amount (i.e., an amount that does not consider color calibration) is firstly determined. Subsequently, the unadjusted treatment amount is corrected taking into account color calibration. Such methods are illustrated with respect to FIG. 5A. In other methods, a treatment amount is determined directly taking into account color calibration. For example, an amount of colorant to be applied might be determined in consideration from color calibration for the printing system; subsequently, a treatment amount is determined based on the amount of colorant to be applied; since this colorant amount is determined using color calibration, the treatment amount considers color calibration. Such methods are illustrated with respect to FIG. 5B. It will be understood that consideration of color calibration for specific conditions in order to determine a treatment amount is not limited to the examples in FIGS. 5A and 5B.

Figure 5A:
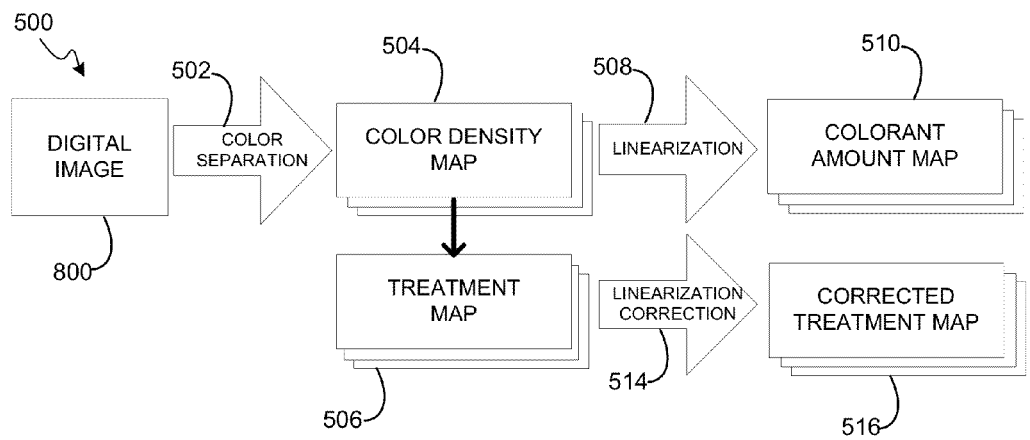
FIGS. 5A and 5B depict block diagrams illustrating determination of treatment amounts for reproduction of digital images on substrates according to examples herein.

Referring to FIG. 5A, it depicts a block diagram 500 illustrating determination of treatment amounts for reproduction of digital image 800 on a substrate. Firstly, a color separation is applied to digital image 800 analogously as illustrated above with respect to FIG. 8. Color separation 502 results in a set of color density maps 504 including a color density map for each basic color of the printing system to reproduce the image (see FIG. 8). From the color density, a set of treatment maps 506 can be derived. Each treatment map includes treatment amounts to be applied to colorant on a specific portion of the substrate. The treatment map may be generated using a correlation between color density for a particular color and treatment amount.

Referring back at FIG. 4, it may be advantageous to adjust an amount of treatment per image region 421A-421I to an amount of colorant of each respective image region 421A-421I. For example, the different image regions 421A-421I may have different colorant amounts according to the resulting desired print colors. Consequently, the image regions 421A-421I having different colorant amounts may require different amounts of treatment fluid, for example for achieving a certain coalescence, bleed, gloss, or other effect, in the respective image regions 421A-421I. Since color density maps 504 are indicative of the colorant amount to be applied in the different regions, they might be used to derive treatment amounts as illustrated by FIG. 5A.

The correlation between color density (and hence colorant amount) and treatment quantity may be based on relating certain color density threshold values or ranges to corresponding treatment amounts.

In other examples, it may be advantageous to base an amount of treatment fluid on a particular colorant color or colorant color combination. Certain colorant colors or configurations of combined colorant colors may require different treatment amounts than other colorant colors or colorant color combinations. For example, a desired treatment fluid amount may be different for Cyan than for Magenta. For example, a desired treatment fluid amount may be different for 50% AC (area coverage) Cyan and 50% AC Magenta, than for 30% AC Yellow and 30% AC Magenta and 40% AC black. Therefore, control engine 108 may be configured to determine specific colorant colors for respective image regions 421A-421I, from the processed digital image data, and set the treatment fluid amounts at least partially based on the determined colorant colors for the respective image regions 421A-421I.

In other examples, control engine 108 may be configured to determine certain configurations of colorant color combinations for the respective image regions 421A-421I, from the processed digital image data, and set the treatment amounts corresponding to the determined configurations of colorant color combinations in the respective image regions 421A-421I.

In a further example, it may be advantageous to determine a treatment fluid amount per image region 421A-421I to a particular sequence of applied colorant colors. For example, different colorant sequences may have different coalescence properties, bleed properties, gloss effects, etc. For example, control engine 108 may be configured to determine sequences with which the colorant colors are applied to substrate 403 in each respective image region 421A-421I, and set amounts of treatment fluid at partially based on the respective colorant color sequences.

As explained, different coalescence and/or bleed properties of the colorants may coexist within printed image 420. To achieve a certain control over the coalescence and/or bleed properties of the colorants on the substrate 403 the treatment amounts may be dosed over the entire printed image 420, corresponding to the estimated coalescence and/or bleed properties of the colorants in the respective image regions 421A-421I. In certain examples, certain degrees of coalescence and/or bleed may be estimated by determining colorant amounts, colorant types or colors, colorant combinations, colorant sequences, but also for example substrate type, pass characteristics, etc. In other examples, certain degrees of coalescence and/or bleed properties pertaining to images, colorants, substrates, etc. are known and stored in an accessible memory such as the memory 264. In certain examples, control engine 108 is configured to determine a degree of coalescence of the colorants in the different image regions 421A to 421I, and set the treatment fluid amounts at least partially based on the degree of coalescence and/or bleed in the respective image regions 421A-421I.

For implementing the correlation between color density and treatment amount, a LUT may be stored in memory 264 that correlate color densities and treatment amounts for each of the basic colors of the printing system. Controller 262 may access the LUT for determining the treatment fluid amount per image region 421A-421I, based on the colorant amount and/or another characteristic and, more specifically, for generating treatment maps 506. (It will be understood that treatment maps 506 may be generated on-the-fly without requiring that the treatment maps are stored as a whole by the printing system.)

Color calibration may be applied to in order to determine colorant amounts for reproducing a region of the digital image on a portion of the substrate. More specifically, a set of rules for color calibration may be applied to color density map 504 for deriving colorant amount maps 510. For example, as illustrated by FIG. 5A, a linearization 508 may be applied to color density values in color density maps 504 in order to derive colorant amount maps 510. It will be understood that color calibration is not limited to linearization, other color calibration steps may be applied to determine color amounts or treatment amounts as disclosed herein.

Figure 6A:
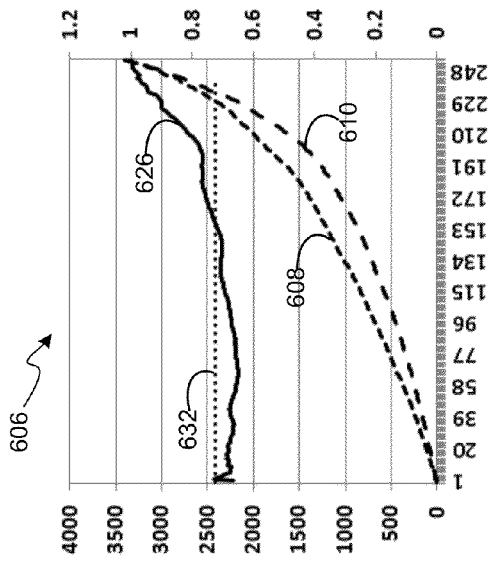
FIGS. 6A to 6D depict examples of linearization curves for different types of substrates.
Figure 6B:
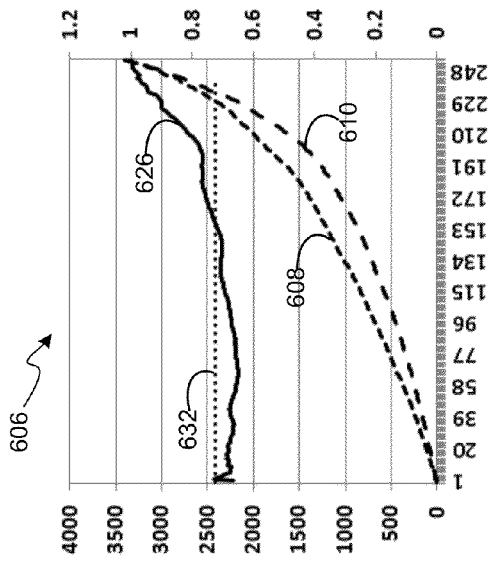
Figure 6C:
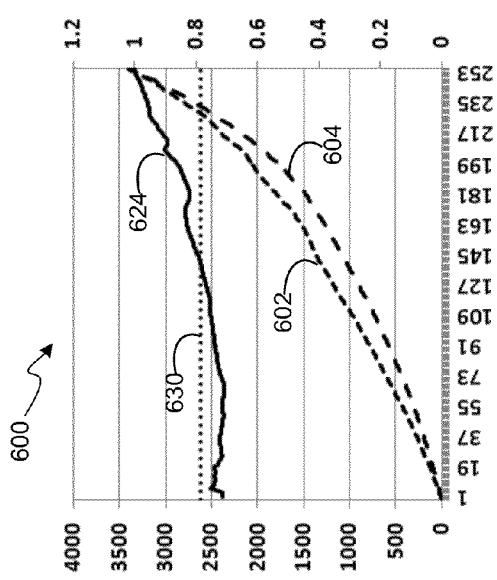
Figure 6D:
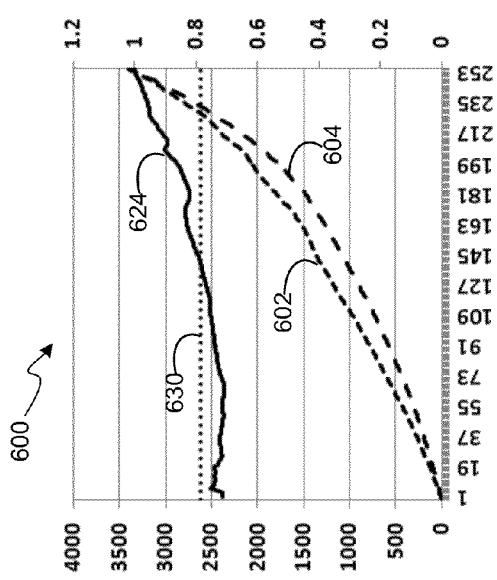

Linearization is illustrated with respect to FIGS. 6A-6D, which depict linearization curves for two distinct types of substrates (substrate 1 and substrate 2). More specifically, graph 600 in FIG. 6A shows linearization curves 602, 604 correlating density (horizontal axis; arbitrary units) with the amount of cyan colorant to be applied (left vertical axis; arbitrary units) for two different substrates; graph 606 in FIG. 6B shows linearization curves 608, 610 correlating density (horizontal axis; arbitrary units) with the amount of magenta colorant to be applied (left vertical axis; arbitrary units) for two different substrates; graph 612 in FIG. 6C shows linearization curves 614, 616 correlating density (horizontal axis; arbitrary units) with the amount of yellow colorant to be applied (left vertical axis; arbitrary units) for two different substrates; graph 618 in FIG. 6C shows linearization curves 620, 622 correlating density (horizontal axis; arbitrary units) with the amount of black colorant to be applied (left vertical axis; arbitrary units) for two different substrates. In FIGS. 6A to 6D the linearization curves have been normalized to the amount of colorant to be applied for the sake of illustration.

Referring back to FIG. 5A, linearization 508 may be applied on color density maps 504 for deriving colorant amount maps 508 by using an LUT stored in memory 264 based on graphs 6A-6D in order to compensate for color variations caused by different substrates. Alternatively, the linearization curves may be modeled (e.g., using polynomial interpolation). The models may be stored in memory 264 and linearization 508 may be performed by validating the models in color density maps 504 for deriving colorant amount maps 508.

As set forth above, an amount of a treatment to be applied on a substrate portion may be determined in consideration of color calibration of the printing system. In the example of FIG. 5A, a corrected treatment map 512 is derived from treatment map 506 in consideration of data related to color calibration of the printing system.

Figure 5B:
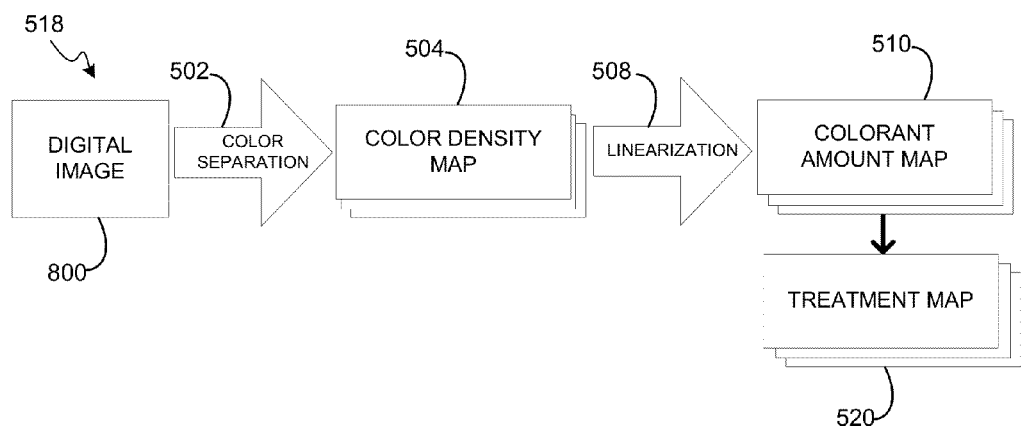

In some examples, illustrated by FIGS. 5A and 5B, considering color calibration for determining a treatment amount includes processing color linearization data for the printing system. More specifically, linearization data, such as depicted in FIGS. 6A to 6D, may be used to determine treatment amounts.

In the example of FIG. 5A, corrected treatment map 512 can be derived by applying a linearization correction 514 to treatment map 506. There is a variety of manners of applying a linearization correction. For example, determining the treatment amount may include applying a linearization factor associated with the color linearization data. This linearization factor might be seen as a linearization correction.

Derivation of a linearization factor can be understood from FIGS. 6A to 6D. For a specific printing system, the correlation between treatment amount and colorant amount might be pre-determined for a specific set of conditions. For example, this correlation might be determined for a specific substrate type (e.g., substrate 1). As can be appreciated from FIGS. 6A to 6D, when a different substrate is to be used, linearization results in a variation of colorant amount to be applied for reproducing a specific color density. In the particular example illustrated, the colorant amount to be applied on substrate 2 for achieving a specific color density is higher than the colorant amount to be applied on substrate 1. Consequently, if color calibration would be neglected for determining treatment amounts when printing on substrate 2, actually, the treatment-to-colorant ratio would be lower than for substrate 1, which in this example is used as default setting for determining treatment-to-colorant ratios. Such divergence in treatment-to-colorant ratios might negatively impact print quality.

(If the treatment-to-colorant ratio would be higher than the ratio for the standard ratios, print quality might not be negatively impacted, but treatment volume would be higher as required thereby negatively impacting costs per printed pages.)

Graphs 600, 606, 612, and 618 include, respectively, curves 624, 626, 628, and 630 that indicate, for each basic color of the printing system, a colorant ratio for achieving the same color density on substrate 2 as compared with substrate 1. (In the example, curves 624, 626, 628, and 630 read on the right vertical axis.) If treatment maps 506 are derived using as default colorant amount the colorant amount for substrate 1 (in other words, printing conditions for substrate 1 are the default printing conditions used to correlate color density maps and treatment maps), then the inverse of curves 624, 626, 628 may be used to determine corrected treatment maps 516 that consider color calibration for the specific printing conditions and, therefore, come closer to a selected treatment-to colorant ratio to achieve a desired colorant treatment. (It should be noted that curves 624, 626, 628 are generated just for a limited range in order to avoid undetermined values, for example for zero density values.)

In principle, every value in treatment map 506 may be corrected using a correction factor for a specific color density. However, such a linearization correction may be too costly in computational means. In some example herein, for reducing computational costs of a linearization correction, an averaged correction factor may be derived from the linearization data. For example, as illustrated in FIGS. 6A to 6D, averaged correction factors 630, 632, 634, 636 may be derived from curves 624, 626, 628, and 630.

The averaged correction factors may be generated in consideration of only a portion of data corresponding to a selected range of color densities. For example, in the specific example of FIGS. 6A to 6D, it can be seen that colorant-to-colorant ratio variations for the different substrate are relatively flat for a majority of color density values (lower density regions). Therefore, the correction factor may be obtained only for that portion of values in order to weight values of color densities that have a higher chance of being reproduced. In other examples, the correction factor may be calculated for specific colorant amount ranges. In graphs 600, 606, 612, 618, averaged correction factors 630, 632, 634, 636 are determined from colorant amounts differing below 2 dpp (drops per pixel).

In some examples, the linearization factor is chosen to overcompensate treatment of the colorant. More specifically, it might be advantageous to use higher treatment amounts as required, in principle, to achieve a particular treatment effect. Although overcompensation might result in a higher usage of treatment, it might ensure that print quality is not compromised by an insufficient usage of treatment. Looking at the graphs in FIGS. 6A to 6D, the correction factor might be chosen from the leftmost graph portion to ensure overcompensation.

According to some examples, determining the treatment amount includes applying a linearization factor associated with at least two sets of color linearization data. Each of the color linearization data sets is associated with different color separations. This might facilitate simplifying computational costs associated with the determination of treatment amounts. More specifically, determining the treatment amount may include applying a linearization factor associated with the color linearization data. The linearization factor is derived from an average based on the at least two sets of color linearization data. For example, referring to FIGS. 6A to 6D, a linearization factor for all basic colors may be chosen as the average of factors 630, 632, 634, 636 for the different basic colors. In other examples, a common correction factor for all basic color may be chosen as the smaller factor of factors 630, 632, 634, 636 for the different basic colors, so that colorant treatment for all basic colors is overcompensated.

The approach depicted in FIG. 5A represents a computational advantageous alternative, since in at least some printing systems, colorant linearizations are calculated during color calibration. A compensation for pre-treatment as illustrated, generally, does not result in significant computation that may delay printer operation.

An alternative approach to considering color calibration for specific conditions of printing a particular image in order to determine a treatment amount is illustrated with respect to FIG. 5B. FIG. 5B depicts a block diagram 518 illustrating determination of treatment amounts for reproduction of digital image 800 on a substrate. In contrast to the example of FIG. 5A, in diagram 518, a treatment map 520 to be used for applying treatment on a substrate is derived directly from a colorant amount map 510. For example, treatment map 520 may be derived by using data correlating treatment amounts with colorant amounts. Such data may be stored as LUT in memory 264. Control engine 108 may access this data to derive colorant amount map 510.

Referring back to FIG. 3, once a treatment amount is determined, a printing system (e.g., printing system 100, 200) may be operated to apply colorant and treatment on a substrate portion according to determined respective amounts. More specifically, the printing system may be operated to apply a colorant amount determined at block 304 and a treatment amount determined at block 306. Operation of a printing system for applying specific amounts of colorant and treatment are illustrated above with respect to FIGS. 1 and 2. As set forth above, the treatment amounts might be applied before (i.e., pre-treatment), after (i.e., post-treatment, or quasi-simultaneously than a colorant amount.

Referring back to FIGS. 5A and 5B, in order to reproduce a digital image 800, a printing system may be operated to apply colorant amounts and treatment amounts as collected in colorant amount maps 510 and corrected treatment map 516 (or, alternatively, treatment map 520). Thereby, corrected amounts that take into account color calibration for specific conditions in printing digital image can be used, thereby facilitating that the different color calibrations that may be applied by a printing system do not impair print quality of an image reproduced using colorants treated on a substrate.

It will be understood that examples herein can be realized using different types of colorants and treatments. For example, the treatment may consist of a cationic polymer for reducing colorant mobility or "fix" ink on a print medium. The ink and fixer compositions may comprise standard dye-based or pigment based inkjet ink and fixer solutions. As a non-limiting example, the fixer may include a water-based solution including acids, salts and organic counter ions and polyelectrolytes. The fixer may include other components such as biocides that inhibit growth of microorganisms, chelating agents (e.g., EDTA) that eliminate deleterious effects of heavy metal impurities, buffers, ultraviolet absorbers, corrosion inhibitors, and viscosity modifiers, which may be added to improve various properties of the ink and fixer compositions. In another example, the fixer may include a component that reacts with the ink The component may have a charge opposite to the charge of the ink For instance, if the ink is anionic, the fixer may include a cationic component. In addition, the fixer may be substantially devoid of a colorant or may include a colorant that does not absorb visible light.

The treatment may also include a precipitating agent, such as a salt or an acid. The salt may include cations, such as calcium, magnesium, aluminum, or combinations thereof. The salt may include, but is not limited to, calcium nitrate, magnesium nitrate, or ammonium nitrate. The acid may be any mineral acid or an organic acid, such as succinic acid or glutaric acid. The precipitating agent may be used to change the conductivity or the pH of the ink, causing the pigment in the ink to precipitate on the surface of the print medium. The fixer may be over-printed and/or under-printed on the print medium relative to the ink Examples may be realized using water based latex-ink and treatment suitable for fixing the latex-ink on the print medium. Thereby, methods and systems disclosed herein may be particularly advantageous. Latex-ink solutions may be more prone to color bleeding and coalescence due to the fluids in the ink solution. Further, a treatment may significantly distort color reproduced by latex inks. This color distortion typically increases with increasing quantities of applied treatment. Therefore, methods and systems described herein are particularly suitable for addressing the problems associated to migration of latex ink without compromising print quality. Other examples include solvent inks, water based inks, dye inks, or UV inks as well as treatments appropriated thereto.

The print medium upon which the inkjet ink and/or fixer may be deposited may be any desired print medium. In a particular example, the print media may be a plain print medium or a commercially coated brochure print medium. Plain print media may include, but are not limited to, Hammermill(R) Fore DP paper, produced by International Paper Co. (Stamford, Conn.), HP Multi-Purpose paper, produced by Hewlett-Packard Inc. (Palo Alto, Calif.), uncoated polyester fabrics, polyester films, or vinyl banners. Commercially coated brochure print media, such as the type used to print brochures or business flyers, are typically hydrophobic and non-porous or less porous than plain paper, including "Lustro Laser", produced by SD Warren Company (Muskegon, Mich.). Other examples include, among others, self-adhesive vinyls, any PVC banners, Polyproline media, polyethylene media, PET media, or polyester fabrics. The print medium may include a raw material. The print medium may be pre-treated or coated materials.

In the foregoing, reference is made to treatment amounts. It will be understood that there is a variety of manners for expressing such treatment amounts. For example, the amount of treatment fluid may be indicated by an estimated average thickness of a treatment fluid layer, for example a thickness in microns or millimeters. In again other examples, the amount of treatment fluid may be indicated in weight per surface area, and/or applied fluid volume per surface area. In again a further example the treatment fluid amount may be indicated in resolution or dots per surface area, which may in certain instances correspond to the fired drop amount. An illustration of different indications of the same treatment fluid amount, that should not be construed to be limiting in any way, is for example 0.48 drops per pixel at a 600 dots per inch resolution, which could for example be equal to 172800 drops per square inch of substrate 4, or for example 0,26 grams per square meter. Colorant amounts may be indicated analogously.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations.

claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A printing method for printing an image on a substrate using a printing system, comprising:
   processing data corresponding to a digital image;
   determining an amount of a colorant for reproducing a region of the digital image on a portion of the substrate;
   determining an amount of a treatment to be applied on said portion of the substrate, wherein determining said amount of a treatment includes applying a linearization factor associated with color linearization data, said treatment being for treating the amount of a colorant on said portion of the substrate;
   considering color calibration of the printing system for specific conditions of printing the image, wherein considering color calibration includes considering color linearization data for the printing system; and
   causing said printing system to apply the colorant and the treatment on said portion of the substrate according to determined respective amounts.

2. The method of claim 1, wherein the linearization factor is chosen to overcompensate treatment of the colorant.

3. The method of claim 1, wherein
   processing data includes performing a color separation of the digital image, the color separation resulting in a color density map associated with the colorant,
   determining said amount of a colorant includes determining an amount of colorant required to obtain a corresponding color density on the substrate based on the color density map and linearization data, and
   determining said amount of a treatment includes applying a linearization factor associated with the linearization data.

4. The method of claim 3, determining said amount of a treatment includes applying a linearization factor associated with at least two sets of color linearization data, each of the color linearization data sets being associated with different color separations.

5. The method of claim 4, wherein determining said amount of a treatment includes applying a linearization factor associated with the color linearization data, the linearization factor being derived from an average based on the at least two sets of color linearization data.

6. A printing system comprising:
   a colorant application device for applying a colorant on a region of a substrate;
   a treatment application device for applying a treatment on said region of a substrate, the treatment being for treating the colorant on said region of a substrate; and
   a control engine to determine an amount of the treatment based on an amount of colorant associated with said region of a substrate, wherein said control engine is to determine said amount of a treatment by applying a linearization factor associated with color linearization data, and considering color calibration for the printing system for specific conditions of printing an image, wherein said control engine is to consider color calibration by processing color linearization data for said printing system.

7. The system of claim 6, wherein the control engine is to determine amount of a treatment for a first color using an amount of colorant required to obtain a corresponding color density for the first color on the substrate based on, at least, a color density map and a color linearization curve for the first color.

8. The system of claim 7, wherein the control engine is to determine said amount of a treatment for the first color applying a linearization factor associated with at least two sets of color linearization data, one of the color linearization data sets being associated to the first color.

9. The system of claim 7, wherein the control engine is to apply a linearization factor derived from an average based on at least two sets of color linearization data.

10. A computer software product comprising a non-transitory medium readable by a processor, the medium having stored thereon a set of instructions for causing a printer to print on a substrate portion, the instructions including:

a set of instructions which, when loaded into a memory and executed by the processor, causes determining an amount of a treatment to be applied for treating a colorant amount on the substrate portion applying a linearization factor to determine said amount of a treatment, the linearization factor being derived from at least one linearization data set, each linearization data set being associated to a color from a color separation, considering color calibration of a printing system for specific conditions of printing on the substrate portion, wherein each color separation including data indicative of said colorant amount to be applied on the substrate portion, said amount of a treatment being based on said colorant amount; and causing said printing system to apply the said colorant amount and a determined amount of a treatment on said substrate portion.

11. The product of claim 10, wherein the linearization factor is chosen to compensate for a variation on the colorant amount to be applied on the substrate portion caused by printer color linearization.

12. The product of claim 11, wherein the linearization factor is chosen to overcompensate treatment of the colorant.

13. The product of claim 10, wherein the linearization factor is derived from at least two linearization data sets, each linearization data set being associated to a color from the color separation.

14. The product of claim 13, wherein the linearization factor is derived by averaging correction factors associated to each of the at least two linearization data set.

* * * * *